United States Patent [19]
Petersen et al.

[11] Patent Number: 6,084,257
[45] Date of Patent: *Jul. 4, 2000

[54] SINGLE CRYSTAL SILICON SENSOR WITH HIGH ASPECT RATIO AND CURVILINEAR STRUCTURES

[75] Inventors: Kurt E. Petersen, San Jose; Nadim Maluf, Mountain View; Wendell McCulley, San Jose; John Logan, Danville; Erno Klaasen, Sunnyvale; Jan M. Noworolski, San Francisco, all of Calif.

[73] Assignee: Lucas NovaSensor, Fremont, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/449,140

[22] Filed: May 24, 1995

[51] Int. Cl.$^7$ ..................................................... H01L 29/82
[52] U.S. Cl. .......................... 257/254; 257/415; 257/417; 257/622; 257/628; 73/514.32; 73/514.21; 73/718; 73/DIG. 1; 438/50; 438/52; 216/8; 216/17; 216/39; 200/329
[58] Field of Search ..................................... 257/622, 627, 257/628, 623, 414, 415, 417, 254; 73/DIG. 1, 514.21, 514.36, 514.29, 724, 718, 514.32; 437/901, 228; 216/39, 8, 17; 200/329; 438/50, 52

[56] References Cited

U.S. PATENT DOCUMENTS

| | | | |
|---|---|---|---|
| 4,730,496 | 3/1988 | Knecht et al. | 73/724 |
| 5,060,526 | 10/1991 | Barth et al. | 73/862.59 |

(List continued on next page.)

FOREIGN PATENT DOCUMENTS

| | | |
|---|---|---|
| 0 368 446 | 5/1990 | European Pat. Off. . |
| 0588371 | 3/1994 | European Pat. Off. . |
| 0591554 | 4/1994 | European Pat. Off. . |
| 0 605 300 | 7/1994 | European Pat. Off. . |
| 54-51490 | 4/1979 | Japan ...................................... 257/420 |
| 94/18697 | 8/1994 | WIPO . |
| WO 94/28427 | 12/1994 | WIPO . |
| WO 96/08036 | 3/1996 | WIPO . |
| 97/01221 | 1/1997 | WIPO . |
| 97/04283 | 2/1997 | WIPO . |

OTHER PUBLICATIONS

V.A. Yunkin et al., "Highly Anisotropic Selective Reactive Ion Etching of Deep Trenches in Silicon" Elsevier Science B.V., Microelectronic Engineering, vol. 23 (1994) pp. 373–376.

Ammar, Elie S. and Rodgers, T.J., "UMOS Transistors on (110) Silicon", IEEE Transactions on Electron Devices, vol. Ed–27, No. 5 (1980).

Sherman, S.J. et al., "A Low Cost Monolithic Accelerometer; Product/Technology Update", IEEE Technical Digest, (1992) pp. 501–504.

Goodenough, Frank, "Redesigned Surface–Micromachined Accelerometer IC Provides Increased Sensitivity of ±1 –5 G Full Scale", Electronic Design, Technology Advances (1995) pp. 37, 40.

PCT Written Opinion dated Feb. 20, 1997 which relates to International Application No. PCT/US96/07605 which corresponds to U.S. application Ser. No. 08/449,140.

(List continued on next page.)

Primary Examiner—William Mintel
Attorney, Agent, or Firm—Morrison & Foerster LLP

[57] ABSTRACT

In one aspect, the invention provides semiconductor sensor which includes a first single crystal silicon wafer layer. A single crystal silicon structure is formed in the first wafer layer. The structure includes two oppositely disposed substantially vertical major surfaces and two oppositely disposed generally horizontal minor surfaces. The aspect ratio of major surface to minor surface is at least 5:1. A carrier which includes a recessed region is secured to the first wafer layer such that said structure is suspended opposite the recessed region.

39 Claims, 8 Drawing Sheets

U.S. PATENT DOCUMENTS

| | | | |
|---|---|---|---|
| 5,132,658 | 7/1992 | Dauenhauer et al. | 338/92 |
| 5,142,781 | 9/1992 | Mettner et al. | 29/890.124 |
| 5,179,499 | 1/1993 | MacDonald et al. | 361/313 |
| 5,198,390 | 3/1993 | MacDonald et al. | 437/203 |
| 5,235,187 | 8/1993 | Arney et al. | 250/306 |
| 5,238,223 | 8/1993 | Mettner et al. | 251/368 |
| 5,285,097 | 2/1994 | Hirai | 257/417 |
| 5,287,082 | 2/1994 | Arney et al. | 338/307 |
| 5,316,979 | 5/1994 | MacDonald et al. | 437/203 |
| 5,363,021 | 11/1994 | MacDonald | 315/366 |
| 5,375,033 | 12/1994 | MacDonald | 361/281 |
| 5,386,142 | 1/1995 | Kurtz et al. | 257/690 |
| 5,393,375 | 2/1995 | MacDonald | 156/643 |
| 5,393,711 | 2/1995 | Biallas et al. | 437/231 |
| 5,397,904 | 3/1995 | Arney et al. | 257/66 |
| 5,399,415 | 3/1995 | Chen et al. | 428/209 |
| 5,426,070 | 6/1995 | Shaw et al. | 437/203 |
| 5,506,175 | 4/1996 | Zhang et al. | 437/228 |
| 5,536,988 | 7/1996 | Zhang et al. | 310/309 |
| 5,563,343 | 10/1996 | Shaw et al. | 73/514.18 |
| 5,565,625 | 10/1996 | Howe et al. | 73/514.16 |
| 5,567,880 | 10/1996 | Yokota et al. | 73/514.33 |
| 5,587,601 | 12/1996 | Kurtz | 257/417 |
| 5,591,679 | 1/1997 | Jakobsen et al. | 437/228 |
| 5,594,171 | 1/1997 | Ischida et al. | 73/514.32 |
| 5,615,143 | 3/1997 | MacDonald et al. | 365/112 |
| 5,627,427 | 5/1997 | Das et al. | 313/308 |
| 5,628,917 | 5/1997 | MacDonald et al. | 216/2 |
| 5,637,539 | 6/1997 | Hofmann et al. | 438/20 |

OTHER PUBLICATIONS

Y. Uenishi et al., "Micro–Opto–Mechanical Devices Fabricated By Anisotropic Etching of (110) Silicon," Proceedings of the IEEE, Micro Electro Mechanical Systems, 1994, pp. 319–324.

K. Petersen, "Silicon as a Mechanical Material," Proceedings of the IEEE, vol. 70, No. 5, May 1982, pp. 420–457.

A. Goyal et al., "Formation of Silicon Reentrant Cavity Heat Sinks Using Anisotropic Etching and Direct Wafer Bonding," IEEE *Electron Device Letters*, vol. 14, No. 1, Jan. 1993, pp. 29–32.

K. Suzuki, "Single Crystal Silicon Micro–Actuators," IEEE *Electronic Devices Technical Digest*, International Electron Devices Meeting, 1990, pp. 625–628.

K. Petersen et al., "Surface Micromachined Structures Fabricated with Silicon Fusion Bonding," IEEE, 1991, pp. 397–399.

J. Bartha et al., "Low Temperature Etching of Si in High Density Plasma Using $SF_6/O_2$," Elsevier Science B.V., MicroElectronic Engineering, vol. 27, 1995, pp. 453–456.

C. Fung et al., "Deep Etching of Silicon Using Plasma," Micromachining and Micropackaging of Transducers, Elsevier Science Publishers B.V., 1985, pp. 159–164.

C. Linder et al., "Deep Dry Etching Techniques as a New IC Compatible Tool For Silicon Micromachining," IEEE, 1991, pp. 524–527.

J. Bryzek et al., "Micromachines on the March," IEEE *Spectrum*, May 1994, pp. 20–31.

SINGLE CRYSTAL SILICON SENSOR WITH HIGH ASPECT RATIO AND CURVILINEAR STRUCTURES

This invention was made with Government support under Contract No. DAAL01-94-C-3411.

BACKGROUND OF THE INVENTION

1. Field of the Invention

The invention relates, in general, to semiconductor microelectronic sensors, and more particularly, to single crystal silicon sensors that include structures with diverse contours and higher aspect ratio geometries.

2. Description of the Related Art

The electrical and mechanical properties of silicon microsensors have been well chronicled. For example, refer to Kurt E. Petersen, "Silicon as a Mechanical Material", Proceedings of the IEEE, vol. 70, No. 5, May 1982. Moreover, there is a large and growing body of knowledge concerning techniques for constructing silicon microstructures, commonly referred to as "micromachining". See, for example, Bryzek, Petersen and McCulley, "Micromachines on the March", IEEE Spectrum, May 1994, pp. 20–31.

Silicon micromachining has blossomed into a vital industry with numerous practical applications. For instance, micromachined silicon pressure and acceleration sensors have found their way into medical instrumentation and automobiles. The high strength, elasticity and resilience of silicon makes it an ideal base material for resonant structures that may, for example, be useful for electronic frequency control. Even consumer items such as watches, scuba diving equipment, hand-held tire pressure gages and inflatable tennis shoes may soon incorporate silicon micromachined sensors.

The demand for silicon sensors in ever expanding fields of use continues to fuel a need for new and different silicon microsensorsensor geometries optimized for particular environments. Unfortunately, a drawback of traditional bulk silicon micromachining techniques has been that the contours and geometries of the resulting silicon microstructures have been significantly limited by these fabrication methods. For example, anisotropic etching of single crystal silicon (SCS) can achieve an anisotrophy rate of 100:1 in the <100> crystallographic direction relative to the <111> direction. The result of such anisotropic etching of SCS, however, typically will be a silicon microstructure with sidewalls that are inclined because of the intersection of the (100) and (111) crystallographic planes. As a result, the contours of silicon microstructures have been limited by the orientation of the internal crystallographic planes. Thus, there has been a need for silicon microsensors having structures with more diverse geometric contours.

The increasing use of microsensors to measure pressure and acceleration has spurred the development of tiny silicon plate structures used as capacitors and to produce electrostatic forces, for example. For instance, there exist microsensors that measure capacitance using an array of interdigitated polysilicon plates. Similarly, there exist microsensors that produce electrostatic forces using an array of interdigited plates. Ordinarily, the surface areas of such plates are relatively small since they typically are formed in a deposited polysilicon layer. Increasing the surface area of such capacitive plates increases their capacitance. Increasing the surface area of such electrostatic drive plates increases their drive capability. Hence, there has been a need for capacitive plates and electrostatic drive plates with increased surface areas.

There also is a need for improved silicon microstructures on which electronic circuitry can be formed. For example, metal oxide semiconductor (MOS) circuits generally are most effective when formed in (100) silicon wafers. Unfortunately, traditional silicon micromachining techniques usually favor the formation of microsensors in (110) wafers. Hence, MOS circuits have not been prevalent in silicon microsensors. Moreover, in some applications there can be a need to thermally isolate a circuit formed as part of a microsensor in order to ensure optimal circuit performance.

A problem with tuneable resonant microstructures formed from materials such as polysilicon or metal is that they can suffer frequency drift over time due to internal crystal stresses that develop from usage. Thus, there is a particular need for a microstructure that employs a high-Q resonator that does not suffer from crystal stresses. It has long been known that SCS is an excellent base material for a resonant structure. It is strong, flexible and highly elastic, and its single crystal structure makes it more resistant to performance degradation. However, tuning the resonant frequency of an SCS resonant structure can be a challenge. Consequently, there is a need for an improved approach to the tuning of a high-Q SCS resonator.

Thus, there has been a need for silicon microsensors that incorporate structures with more diverse geometries including structures with contours that are not limited by the crystallographic planes of silicon and plates with increased surface areas. There also has been a need for silicon microsensors with structures that are better suited to the formation of electronic circuitry. In addition, there has been a need for silicon microstructures with improved resonant structures. The present invention meets these needs.

SUMMARY OF THE INVENTION

In one aspect, the invention provides semiconductor sensor which includes a first single crystal silicon wafer layer. A single crystal silicon structure is formed in the first wafer layer. The structure includes two oppositely disposed substantially vertical major surfaces and two oppositely disposed generally horizontal minor surfaces. The aspect ratio of major surface to minor surface is at least 5:1. A carrier which includes a recessed region is secured to the first wafer layer such that said structure is suspended opposite the recessed region.

DETAILED DESCRIPTION OF THE PREFERRED EMBODIMENTS

The present invention comprises a single crystal silicon sensor with curvilinear structures and high aspect ratio structures and an associated method of manufacture. The following description is presented to enable any person skilled in the art to make and use the invention. Descriptions of specific applications are provided only as examples. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
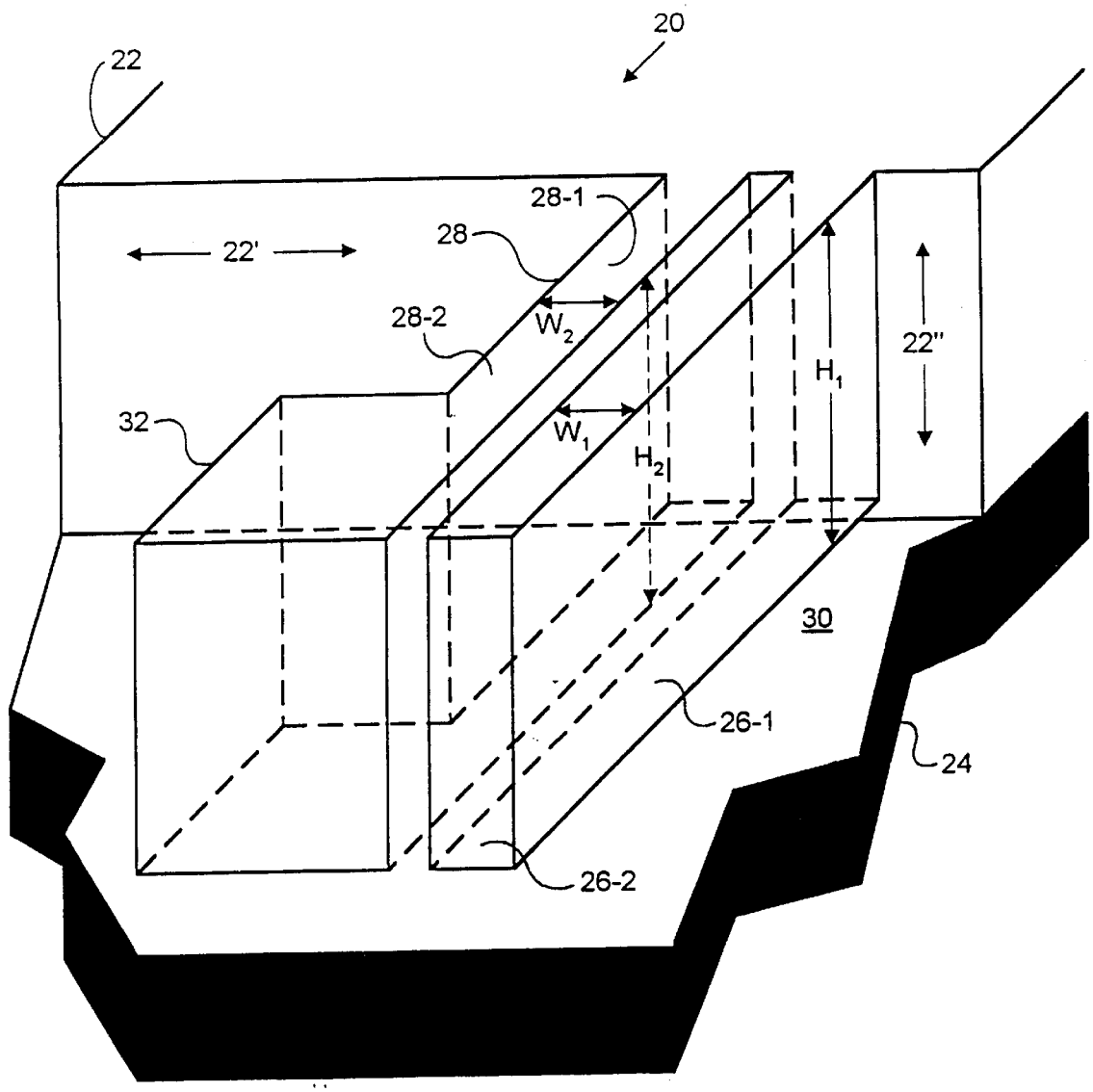
FIG. 1 is a perspective fragmented view of a portion of a silicon sensor in accordance with an embodiment of the invention.

Referring to the illustrative drawings of FIG. 1, there is shown a partial, fragmented, perspective view of a portion of a silicon microsensor 20 in accordance with a presently preferred embodiment of the invention. The microsensor 20 includes a first single crystal silicon (SCS) wafer layer 22 bonded to a carrier 24. First and second beams 26 and 28 depend from the first layer 22. The phantom lines in FIG. 1 represent surfaces that are hidden from view. The two beams 26 and 28 are suspended over a recessed region 30 of the carrier 24, such that the beams can move relative to the carrier 24.

Beam 26 includes a pair of oppositely facing major vertical surfaces 26-1 and a minor vertical distal end surface 26-2 and further includes a pair of opposite facing horizontal surfaces 26-3. Similarly, beam 28 includes a pair of oppositely facing major vertical surfaces 28-1 and a pair of oppositely facing horizontal surfaces 28-2. It will be appreciated that only one of each of the major vertical surfaces in 28-1 and only one of the horizontal surfaces 28-2 are visible in the drawing. In addition, the second beam 28 has a seismic mass 32 secured to a distal end thereof.

In operation, each of the two beams deflect in the plane of the first layer 22 as indicated by arrows 22' but cannot deflect in a direction generally perpendicular to the plane of the first layer 22 as indicated by arrows 22". This ability to flex in the plane of the first layer 22 but not out of the plane of the first layer 22 results from the aspect ratio of the beams; the ratio of their vertical heights $H_1$ and $H_2$ respectively to their widths, $W_1$ and $W_2$, respectively.

Figure 2:
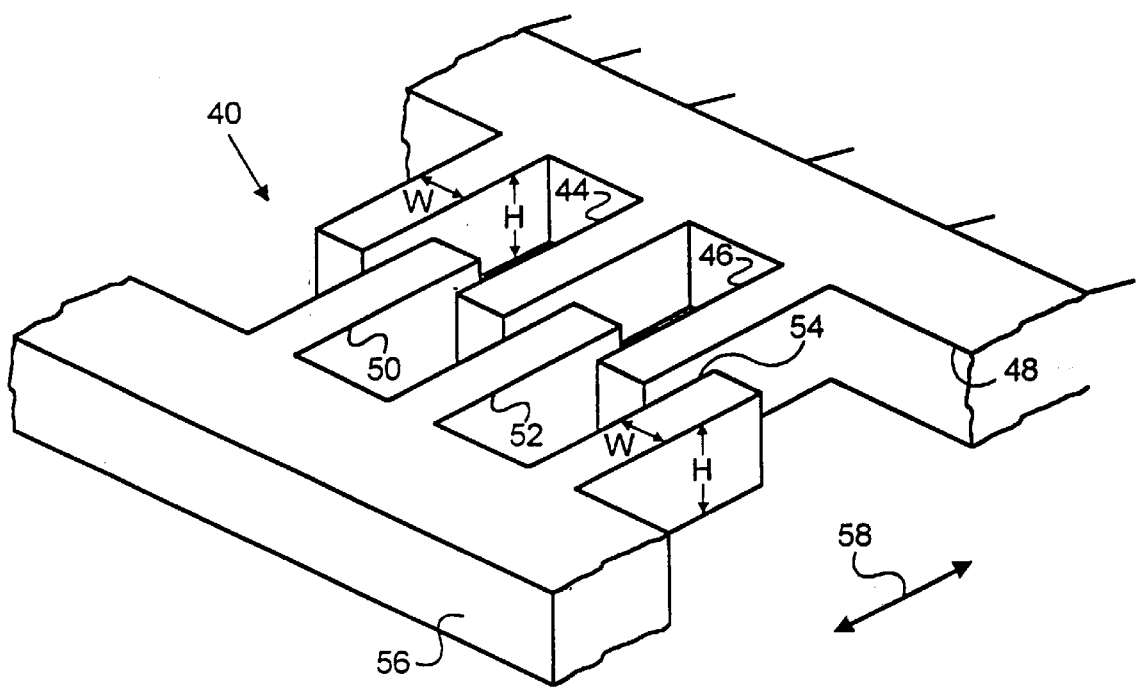
FIG. 2 is a perspective view of an array of high aspect ratio interdigitated vertical plates used either for capacitance pick-up or electrostatic force in accordance with an embodiment of the invention.

Referring to the illustrative drawings of FIG. 2, there is shown an array of interdigitated plate structures in accordance with an embodiment of the invention. Fixed plate structures 42, 44 and 46 are integrally secured to a fixed semiconductor structure 48. Single crystal semiconductor plate structures 50, 52 and 54 all depend from a moveable silicon structure 56. The direction of movement of the moveable plate structures 50, 52 and 54 relative to the fixed plate structures 42, 44 and 46 is indicated by the arrow 58.

Each of the fixed plates and the moveable plates can be doped to make them conductive. In one embodiment, the dopant is boron and the dopant concentration is between $10^{16}$/cm$^3$ to $10^{20}$/cm$^3$. Alternatively, phosphorus or arsenic can be used as the dopant, for example. The structure illustrated in FIG. 2 can operate as a series of parallel capacitors. The amount of total capacitance depends upon the degree of overlap of the interdigitated fixed plates 42, 40 and 46 with the moveable plates 50, 52 and 54. The movement of the moveable plates along the axis indicated by arrow 58 determines the amount of overlap. Alternatively, the structure in FIG. 2 also can serve as an electrostatic drive mechanism. In that case, a voltage differential between the fixed plates 42, 44 and 46 and the moveable plates 50, 52 and 54 can exert an electrostatic force which can induce the moveable plates to alter the amount of overlap with the fixed plates.

It will be appreciated that the surface areas of the interdigitated plates can have an important bearing up on the capacitance between plates of the interdigitated structure in FIG. 2. Likewise, the amount of overlapping surface area can also have an important bearing on the amount of electrostatic force that can be exerted by a structure like that in FIG. 2.

Thus, to the extent that the current invention permits the production of plate devices that have relatively high aspect ratios (plate height/plate width), the invention facilitates the production of more efficient interdigitated plate capacitor arrays and interdigitated plate electrostatic drive arrays.

Figure 3:
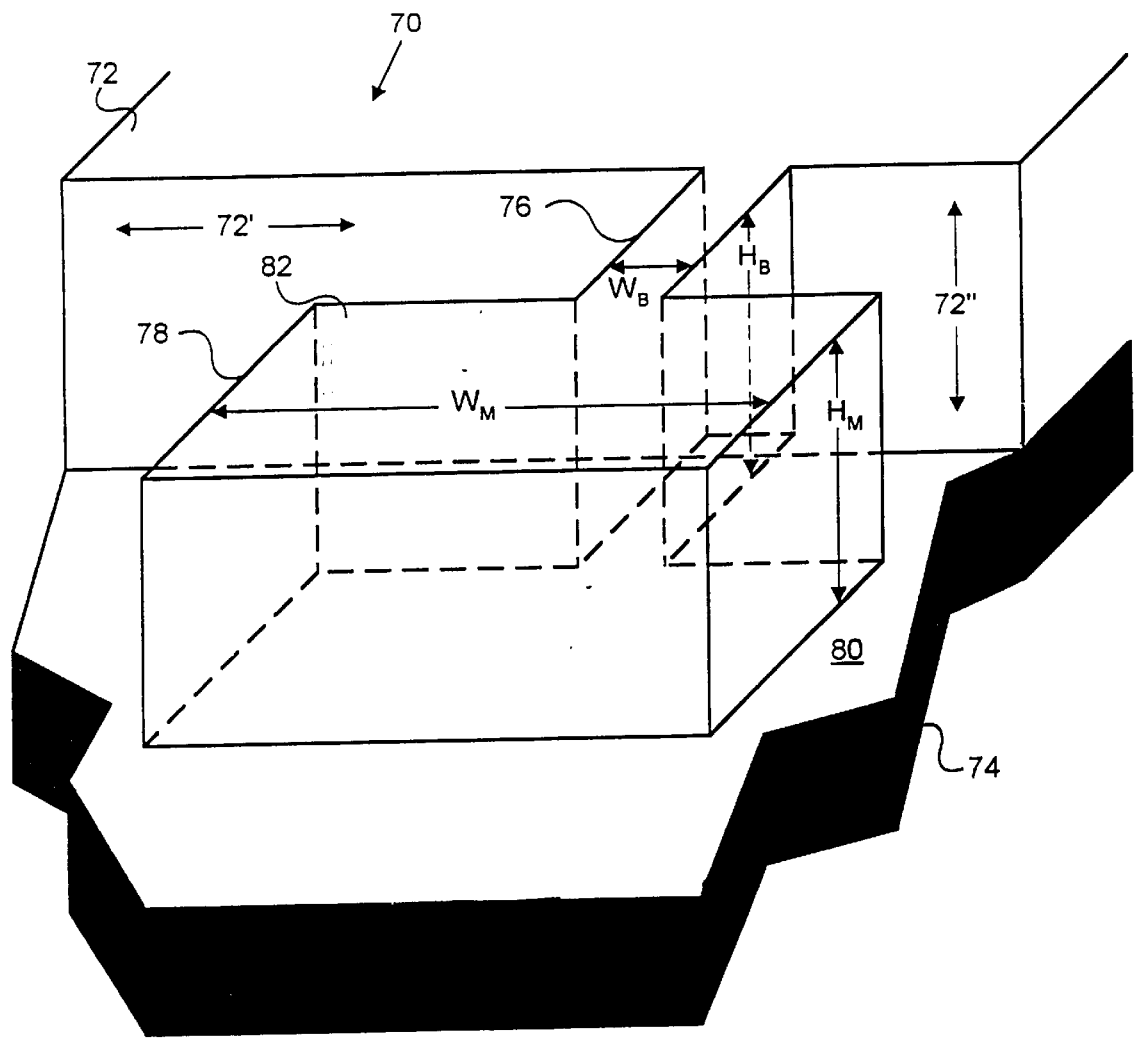
FIG. 3 is a perspective fragmented view of a portion of a silicon sensor in accordance with an embodiment of the invention.

Referring to the illustrative drawings of FIG. 3, there is shown a perspective fragmented view of a portion of a SCS silicon microsensor 70 in accordance with the embodiment of the present invention. The microsensor 70 includes a first SCS layer 72 bonded to carrier 74. A beam 76 having a seismic mass 78 formed on a distal end thereof depends from the first layer and is suspended over a recessed region 80 of the carrier 74 such that the beam 76 and its mass 78 can move relative to the carrier 74.

The aspect ratio (vertical height/horizontal width) of the beam is large enough such that it can deflect in the plane of the first layer 72 indicated by arrow 72' but cannot deflect out of the plane of the layer 72 indicated by arrow 72". The processing techniques, described below, permit the fabrication of a beam with an aspect ratio of at least 20:1.

Moreover, since the processing techniques described below permit deep etching independent of crystallographic directions, the beam 76 and the seismic mass 78 can be formed in (100) silicon wafers is suitable for fabrication of MOS circuits. Hence, a MOS circuit can be readily formed in the upper face 82 of the scismic mass using standard semiconductor processing techniques.

Figure 4:
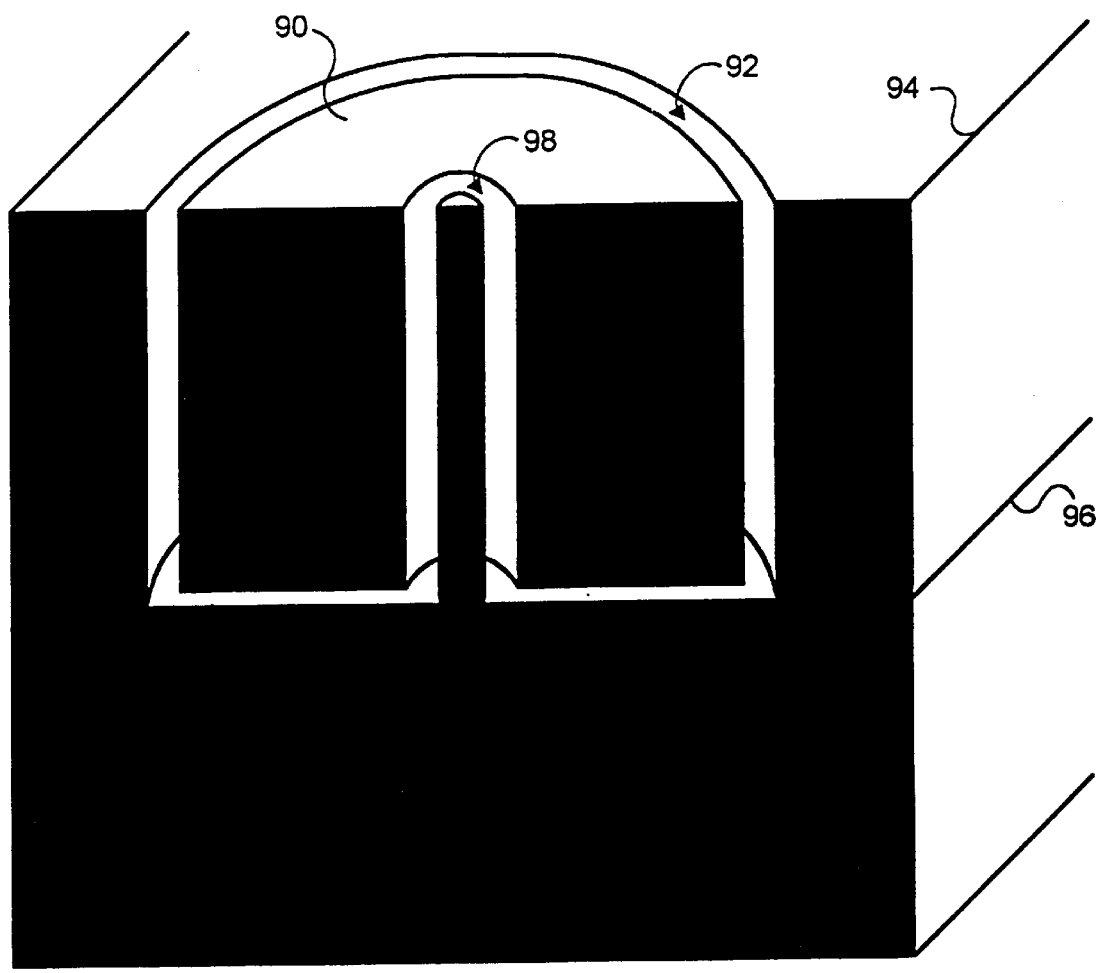
FIG. 4 is a cross-sectional perspective view of a curvilinear released structure in accordance with an embodiment of the invention.

Referring to the illustrative drawings of FIG. 4, there is shown a cross-sectional view of a fully released SCS structure 90 still seated within a recess 92 which has been etched into a first SCS wafer layer 94, which is bonded to a carrier 96 in accordance with invention. In particular, the released structure 90, which is shown in cross-section, is cylindrical in shape. It has a curvilinear outer circular (circumference) defined by the etched away region 92. In addition, it has a circular (curvilinear) inner core defined by etched away region 98. The inner core of the released structure surrounds an upstanding portion of the carrier 96 which, for example, can serve as a stabilizing member or an axel.

Thus, it will be appreciated that the fabrication techniques described below can be used to create etch patterns which are curvilinear in shape. The term curvilinear as used herein shall mean bending without angles. A curvilinear structure is one which has portions thereof which bend without precise angles, although other portions may comprise straight segments or angled joints. Examples of curvilinear structures include circles, ellipses and spirals.

Figure 5:
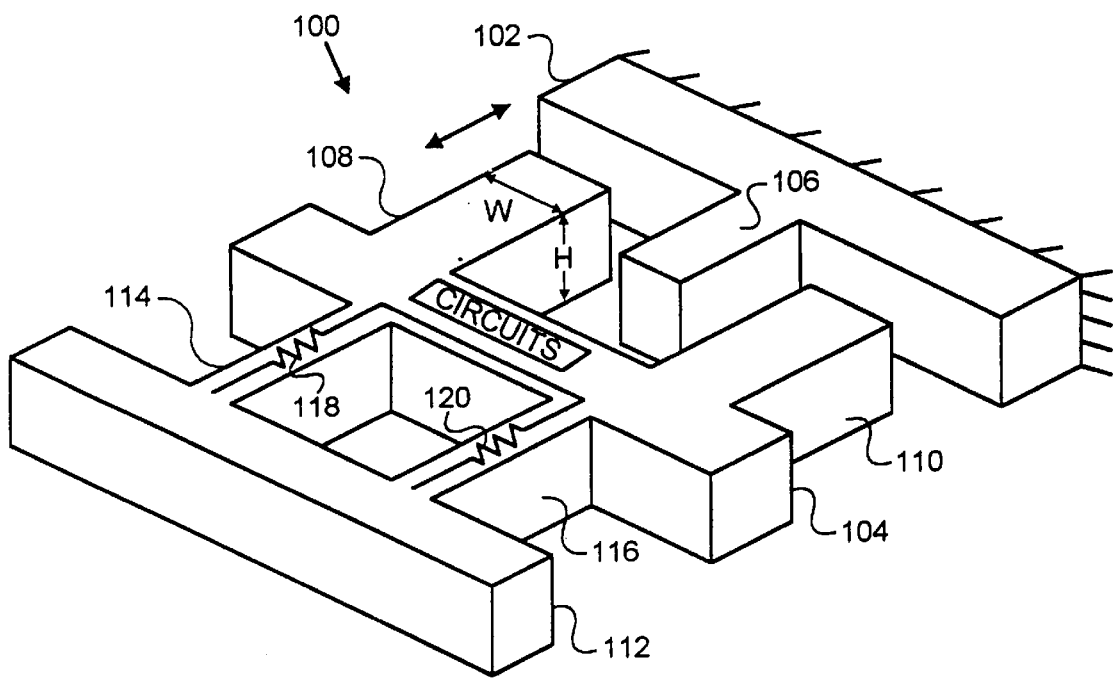
FIG. 5 is a perspective view of a portion of suspended structures and a portion of a fixed structures used as a variable capacitor in accordance with an embodiment of the invention.

Referring to the illustrative drawings of FIG. 5, there is shown a perspective partial view of a variable capacitor 100 in accordance with an embodiment of the invention. The variable capacitor comprises a fixed structure 102 and a moveable structure 104. The fixed structure includes a capacitor plate 106 which is interdigitated with parallel plates 108 and 110 which depend from the moveable structure 104. It will be appreciated that the moveable structure 104 depends from a fixed SCS wafer layer 112 and that the entire moveable structure is suspended over a carrier (not shown). Moreover, it will be appreciated that the capacitor may have additional plates which are not shown. The processes for producing the moveable structure will be appreciated from the discussion below.

The moveable structure 104 also includes thermal actuators 114 and 116. The thermal actuators contain circuitry 118 and 120 which, when electric current is passed through them causes the thermal actuators to heat up resulting in expansion of the SCS beams in which they are disposed. The heating of the beams and their expansion causes a movement of the capacitive plate 108 and 110 toward the fixed structure 102. As a result, there is greater overlap of the plates 108 and 106 and of the plates 106 and 110. The increased overlap results in an increased capacitantance. Since the current invention permits the fabrication of structures such as those shown in FIG. 5 using (100) silicon, complex MOS used to monitor capacitance between the plates 108 and to control the flow of current in the thermal actuators can be disposed directly on the moveable structure. Furthermore, since the processing techniques described below permit the production of plates with relatively high aspect ratios (height/width) a large number of capacitive plates can be squeezed in close to each other, and the increased height afforded by the deep etching process ensures that greater surface area will be exposed when the plates are fully engaged.

Figure 6:
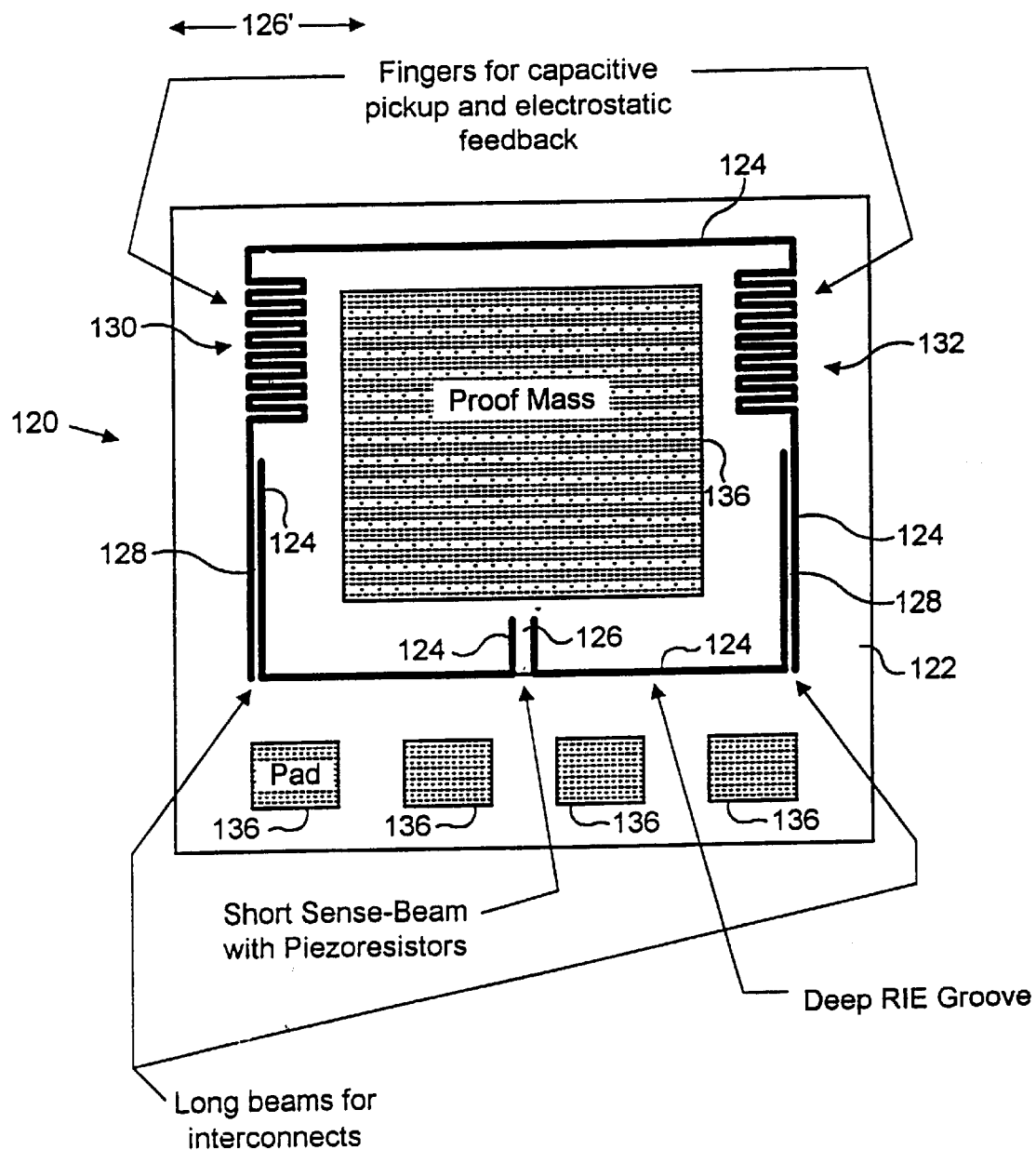
FIG. 6 is a top elevation view of an acceleration sensor in accordance with an embodiment of the invention.

Referring to the illustrative drawings of FIG. 6, there is shown a top elevation view of a SCS accelerometer in accordance with a current embodiment in the invention. A first SCS wafer layer 122 has deep grooves 124 formed therein to define a suspended beam 126 elongated mechanical guidance beams 128 and a plurality of interdigitated electrostatic plates 130 and 132. The released structure includes a proof mass 134. Piezoresistors (not shown) are disposed at the foot of the beam 126 at the point of highest stress. Interconnect pads 136 are used to make of-chip electrical connections to the accelerometer 120.

It will be appreciated that the suspended structures are suspended over a carrier (not shown) and can move freely relative to the carrier. The sense-beam 126 and the interdigitated plates 130 and 132 can have relatively large aspect ratios (height/width). This relatively high aspect ratio can prevent the beam from twisting due to off-axis acceleration. As explained above, a high aspect ratio beam can move readily within the plane of the first wafer 122 but cannot move out of that plane. Moreover, the relatively high aspect ratio of the interdigitated plates permits increased capacitive coupling and also allows for increased electrostatic force. The elongated beams 128 serve as stabilizers. They flex much more readily than the short sense-beam 126. Hence, they are not used for actual measurements of stress and therefore acceleration. However they are used to stabilize the movement of the relatively large collection of suspended structures.

In operation, the short sense-beam will flex in a direction indicated by arrow 126'. The collection of interdigitated plates 130 and 132 will either experience an increase in overlap capacity or a decrease in overlap capacity depending upon the direction of deflection of the sense-beam 126. Thus, the capacitive plates can be used to sense a degree of deflection of the sense-beam. Alternatively, the interdigitated beams can be used to apply an electrostatic force sufficient to overcome the deflection of the beam. The degree of electrostatic force necessary to overcome such deflection is related to the acceleration experienced by the accelerometer 120. The circuitry used to determine the amount of flexure of the sense-beam, and the amount of overlap of the interdigitated plates 130 and 132 or, alternatively, to apply a countervailing electrostatic force, employ techniques well known to those skilled in the art and that are not part of the present invention. Hence they need not be described herein.

Figure 7:
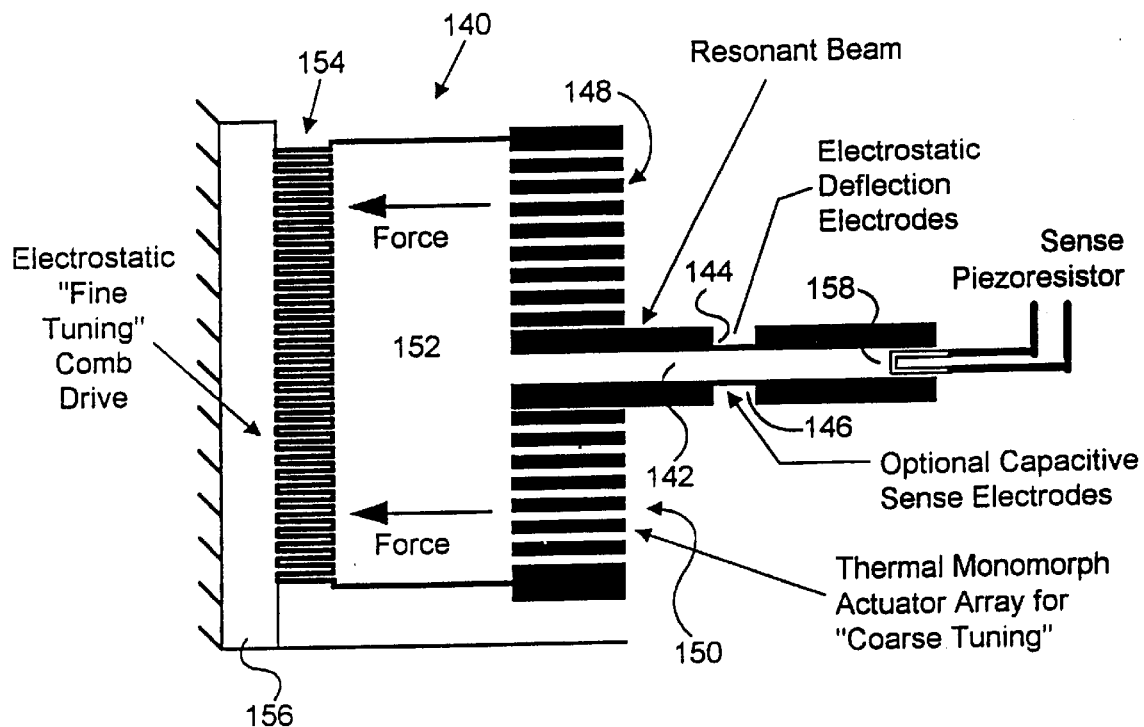
FIG. 7 is a top elevation view of a variable frequency, high-Q resonator in accordance with an embodiment of the invention.

Referring to the illustrative drawings of FIG. 7, there is shown a top elevation view of a variable frequency, high-Q single crystal silicon resonator. The dark regions represent deep channels or trenches formed through the deep reactive ion etch process described below. The resonator 140 includes a resonant beam 142 disposed between a pair of electrostatic deflection electrodes 144 and 146. A plurality of beams arrayed on either side of the beam 146 serve as thermal actuators 148 and 150. An enlarged head portion 152 has a plurality of plate elements which are interdigitated with complementary plate elements of a fixed structure 156. A piezoresistive element is formed in the most high stress region of the resonator 140 near its base that interconnects with the single crystal silicon first layer.

In operation, the electrostatic deflection electrodes 144 and 146 apply an AC voltage between them which excites the beam 142 to resonate. The frequency of resonation of the beam 142 can be detected using the peizoresistive sense element 158. The resonant frequency of the beam can be altered by changing the stiffness of the beam. The array of thermal actuators 148 and 150 can be used to selectively tune the resonant frequency of the beam.

Specifically, by differential heating of the thermal actuators 148 and 150, a coarse stiffening of the beam 142 can be achieved. This coarse stiffening of the beam 142 achieves a coarse tuning of its resonator. The thermal actuator achieves stiffening of the beam by pressing against the head plate 152. This pressing against the head plate stiffens the beam. The array of interdigitated plates electrostatic force plates 154 are used to achieve fine tuning of the resonant frequency of the beam. The amount of electrostatic force applied by using the array of plates 154 can be controlled with relative precision. Hence, the thermal actuators 148 and 150 are used for coarse tuning, and the electrostatic force plates are used for fine tuning. In this manner, a relatively high-Q resonator can be achieved. A high-Q resonator is one with an accurate and narrow frequency band.

The process for fabricating a silicon microsensor in accordance with a presently preferred embodiment of the invention is explained with reference to FIGS. 8A–G. The current embodiment employs two silicon wafers. The process results in the formation of a prescribed SCS microstructure as an integral portion of a first wafer. A second wafer serves as a carrier for the first wafer as explained below. Alternatively, the carrier can be formed of glass (pyrex), for example. It will be understood, of course, that although the following discussion refers to only two wafers, the principles can be applied to the formation of a microsensor comprising a stack of more than two wafers.

Figure 8:
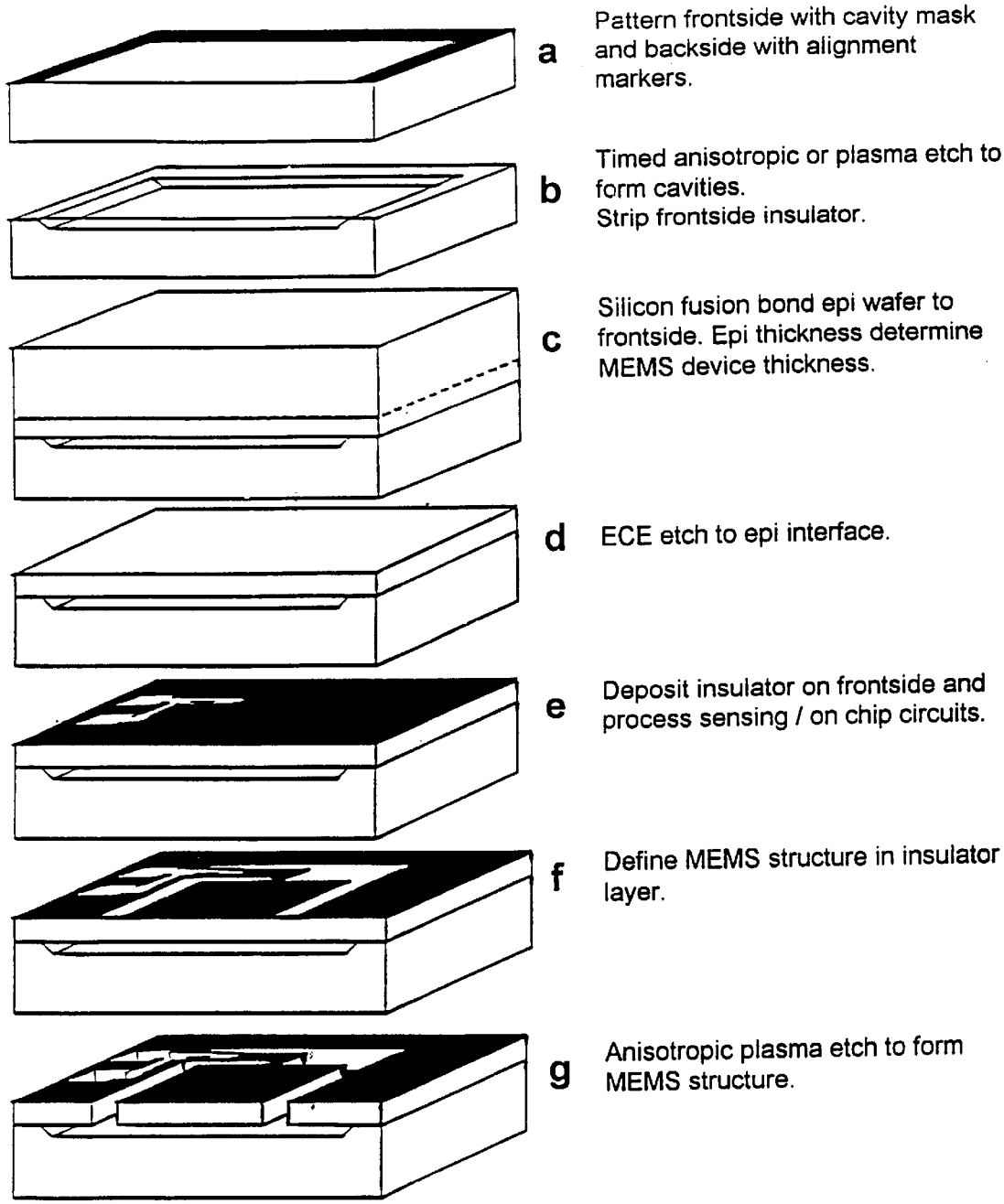
FIGS. 8A–8G illustrate fabrication process flow in accordance with the invention.

In FIG. 8A, the second wafer is patterned with a photoresist which defines a recessed region to be formed in the second wafer. In FIG. 8B, the recessed region is formed in the second wafer using standard semiconductor techniques such as, for example, plasma etching, wet-etching with KOH or other silicon etchants, or differential oxide growth. The recessed region can have any arbitrary geometry and can have any required depth, from <0.1 micron to > 100 microns, for example.

It should be appreciated that the recessed region need not have a single, uniform depth. For example, several standard silicon etch steps may be employed to produce several different depths that can be used for different mechanical functions. Moreover, the second wafer surface can be either bare silicon or it can be coated with an oxide layer. Also, the base of the recessed region can be either bare silicon, oxidized silicon, doped silicon, or it can be coated with any other thin film capable of withstanding subsequent wafer bonding and processing temperatures.

In FIG. 8C, the patterned surface of the second wafer is bonded to the first wafer by silicon fusion bonding (or direct bonding) process. Fusion bonding techniques are well known. For example, refer to, K.E. Petersen, D. Gee, F. Pourahmadi, R. Craddock, J. Brown, and L. Christel, "Surface Micromachined Structures Fabricated with Silicon Fusion Bonding," Proceedings, Transducers 91, June 1991, at pp. 397–399 which is expressly incorporated herein by this reference. In a currently preferred fusion bonding technique, the first and second wafers are made hydrophilic. That is, they are treated with an agent such as hot nitric acid or a hot sulfuric acid and hydrogen peroxide solution or another strong oxidant, that causes water to adhere to them. The two wafers then are placed in an oxidizing atmosphere at a temperature of 400° C.–1200° C. for approximately one hour.

The silicon fusion bonding technique described above bonds the first and second wafers together without the use of an intermediate glue material that could have a different coefficient of thermal expansion than the single crystal silicon wafers. Furthermore, fusion bonding can be performed in which oxide or nitride layers have been formed in the bonded surfaces of one or both of the wafers.

As an alternative to fusion bonding, for example, the first and second wafers can be adhered together with an adhesive such as a photoresist. As another alternative, the first and second wafers can have their major surfaces coated with a metal layer used to alloy the wafers to one another. In the event that a glass carrier is used instead of the second silicon wafer, the first wafer can be anodically bonded to such glass carrier.

In FIG. 8D, the first wafer is thinned and polished to the thickness required by the particular application. Alternatively, electrochemical etching can be used to thin the wafer. In FIG. 20E, any necessary circuits or other thin film depositions and patterning can be performed using standard silicon processing techniques. Since the fusion bond is typically annealed at high temperature (>900° C.), there are few, if any, limitations imposed on the circuit processing temperatures to avoid harming the bond. Moreover, since the subsequent etch process discussed below is a dry etch, on-chip circuits can be protected with a deposited oxide layer or a silicon nitride layer of about 1.5 microns thickness or by photoresist.

In FIG. 8F, the first wafer is patterned for a Deep Reactive Ion Etching (DRIE) step which defines the regions of the "top" wafer to be etched. DRIE techniques have become increasingly well known. For example, refer to: V. A. Yunkin, D. Fischer, and E. Voges, "Highly Anisotrophic Selective Reactive Ion Etching of Deep Trenches in Silicon," Microelectronic Engineering, Vol. 23, 1994, at 373–376; C. Linder, T. Tschan, N. F. de Rooij, "Deep Dry Etching Techniques as a New IC Compatible Tool for Silicon Micromachining," Proceedings, Transducers '91, June 1991, at 524–527; C. D. Fung and J. R. Linkowski, "Deep Etching of Silicon Using Plasma," Proceedings of the Workshop on Micromachining and Micropackaging of Transducers, Nov. 7–8, 1984, at 159–164; and J. W. Bartha, J. Greeschner, M. Puech, and P, Maquin, "Low Temperature Etching of Si in High Density Plasma Using $SF_6/O_2$," Microelectronic Engineering, Vol. 27, 1995, at 453–456. Reactive Ion etch equipment now allows the etching of holes or trenches which are very deep (>100 microns), while maintaining high aspect ratios (the ratio between the depth of the etched region and the width of the etched region. It has been found that this equipment is capable of at least 20:1 aspect ratios for trenches as deep as 300 microns.

DRIE, in essence, involves a synergistic action between chemical etch and ion bombardment. Impinging energized ions chemically react with the silicon surface. The DRIE process advantageously etches in the vertical direction at a much higher rate than in the lateral direction (i.e., anisotropically) regardless of silicon crystal planes or crystal orientation. As a result, relatively deep substantially vertical trenches or slots can be formed in the SCS first wafer. These substantially vertical trenches or slots can be formed anywhere in the first wafer regardless of crystallographic orientation within the wafer. Consequently, high aspect ratio structures such as capacitive or electrostatic plates can be formed, and arbitrarily contoured structures such as circles, ellipses and spirals can be formed.

In FIG. 8G, a DRIE process is used to etch completely through the first wafer. The DRIE etching step mechanically "releases" the SCS microstructures formed in the first wafer, which are then free to move relative to the second wafer. Suspended plate/beam structures with aspect ratios (height/width) of up to 20:1 have been fabricated using the DRIE processes described below.

In one presently preferred approach to DRIE etching, high density plasma provides the basis for the high silicon etch-rate (5 $\mu$m/min.). The etching chemical is $SF_6$ at 2.5 pascals of pressure. A layer of $SiO_2$ or a Low Temperature Oxide mask serves as the patterning mask described in connection with FIG. 20F. A cryogenically cooled chuck, holding the wafer at approximately −100° C., causes the condensation of a very thin protective layer on the side walls of etched grooves. This masks the sidewalls, resulting in high aspect ratios (>15:1) even for very deep grooves. Oxygen additive gas plus $CHF_3$ additive gas help provide high $Si/SiO_2$ etch-rate ratios (>300:1) so simple 1 $\mu$m thick thermal oxide can be used as a mask for grooves etched at least as deep as 300 $\mu$m. The "micromachining etch tool" available from Alcatel which has a place of business in San Jose, Calif. can be employed to perform the Cryogenic DRIE.

In an alternative DRIE process, an inductively coupled plasma source etches the silicon using photoresist as a mask. Polymerization of the photoresist mask on the sidewalls of the etched trenches slows the lateral etch rate and allows high anisotropy. The etching chemical is $SF_6$ at 50 millitorrs. Oxygen additive gas and fluorinated gas available from Surface Technology Systems help provide high Si/photoresist etch-rate ratios. A six micron photoresist serves as the patterning mask discussed in reference to FIG. 20F. The photoresist selectivity is approximately 50:1, which makes it possible to etch to depths of 300 $\mu$m with about 6 $\mu$m of resist. The "multiplex RIE system", available from Surface Technology Systems (STS) which has a place of business in Palo Alto, Calif. can be employed to perform inductively coupled plasma DRIE.

While specific embodiments of the invention have been described and illustrated, it will be appreciated that modification can be made to these embodiments without departing from the spirit of the invention. Thus, the invention is intended to be defined in terms of the following claims.

What is claimed is:

1. A semiconductor transducer comprising:
a first single crystal silicon wafer layer;
a curvilinear single crystal silicon beam formed in said first wafer layer and including two generally opposite facing first substantially vertical surfaces and two generally opposite facing first generally horizontal surfaces; and
a second single crystal silicon wafer layer including a recessed region wherein said second wafer layer is secured to said first wafer layer such that said curvilinear beam is suspended opposite the recessed region.

2. The transducer of claim 1 wherein said first wafer layer and said second wafer layer are fusion bonded together.

3. The transducer of claim 1 wherein said first layer is formed of (100) oriented silicon crystal.

4. The transducer of claim 1 wherein an aspect ratio of the first substantially vertical surfaces to the first generally horizontal surfaces is at least 5:1.

5. The transducer of claim 1 wherein an aspect ratio of the first substantially vertical surfaces to the first generally horizontal surfaces is at least 20:1.

6. The transducer of claim 1,
wherein said beam further includes two generally opposite facing second substantially vertical surfaces and two generally opposite facing second generally horizontal surfaces; and
wherein an aspect ratio of the first substantially vertical surfaces to the first generally horizontal surfaces differs from the aspect ratio of the second substantially vertical surfaces to the second generally horizontal surfaces by at least 2:1.

7. The transducer of claim 1 wherein said first substantially vertical surface has a height of at least 10 microns.

8. A semiconductor transducer produced by:
providing a first single crystal silicon wafer layer;
providing a carrier including a recessed region;
bonding the first wafer layer to the carrier with the recessed region facing the first wafer layer; and
etching substantially vertically through the first wafer layer opposite the recessed region in a curvilinear pattern so as to form a curvilinear beam structure integral with the first wafer layer and suspended over the recessed region.

9. The transducer of claim 8 wherein etching includes reactive ion etching.

10. The transducer of claim 8 wherein providing the first wafer layer includes providing a single crystal (100) oriented silicon wafer layer.

11. The transducer of claim 8 further including thinning the first wafer layer to not less than ten microns.

12. The transducer of claim 1 wherein said curvilinear beam is secured at only one end thereof to said first wafer layer.

13. The transducer of claim 1 wherein said curvilinear beam is secured at one end thereof to said first wafer layer and includes a seismic mass at the other end thereof.

14. The transducer of claim 1 wherein said curvilinear beam is secured at one end thereof to said first wafer layer and includes an electronic circuit formed in the other end thereof.

15. The transducer of claim 1,
wherein said first layer is formed of (100) oriented silicon crystal; and
wherein said curvilinear beam is secured at one end thereof to said first wafer layer and includes an electronic circuit formed in the other end thereof.

16. The transducer of claim 1 wherein said curvilinear beam is secured at one end thereof to said first wafer layer and includes a plurality of vertical plates formed in the other end thereof.

17. The transducer of claim 1,
wherein said curvilinear beam is secured at one end thereof to said first wafer layer and includes a plurality of vertical plates formed in the other end thereof; and
wherein said vertical plates have an aspect ratio of at least 10:1.

18. The transducer of claim 1,
wherein said curvilinear beam is secured at one end thereof to said first wafer layer and includes a plurality of vertical plates formed in the other end thereof and further includes an electronic circuit formed in the other end thereof.

19. The transducer of claim 1,
wherein said first layer is formed of (100) oriented silicon crystal; and
wherein said curvilinear beam is secured at one end thereof to said first wafer layer and includes a plurality of vertical plates formed in the other end thereof and further includes an electronic circuit formed in the other end thereof.

20. The transducer of claim 1,
wherein said first layer is formed of (100) oriented silicon crystal;
wherein said curvilinear beam is secured at one end thereof to said first wafer layer and includes a plurality of vertical plates formed in the other end thereof and further includes an electronic circuit formed in the other end thereof; and
wherein said vertical plates have an aspect ratio of at least 10:1.

21. The transducer of claim 1 wherein said curvilinear beam is secured at both ends thereof to said first wafer layer.

22. The transducer of claim 1 wherein said curvilinear beam includes a plate secured at only one end thereof to said first wafer layer.

23. A transducer produced according to claim 8.

24. A transducer produced according to claim 11.

25. A semiconductor transducer comprising:
a first single crystal silicon wafer layer;
a curvilinear single crystal silicon beam structure formed in said first wafer layer and secured at one end thereof to said first wafer layer and including a plurality of vertical plates formed in the other end thereof wherein the curvilinear beam structure includes two generally opposite facing first substantially vertical surfaces and two generally opposite facing first generally horizontal surfaces; and
a second single crystal wafer layer including a recessed region wherein said second wafer layer is secured to said first wafer layer such that said curvilinear beam structure is suspended opposite the recessed region.

26. The transducer of claim 25 wherein the vertical plates have an aspect ratio of at least 10:1.

27. The transducer of claim 25 further including:
an electronic circuit formed in the other end of the curvilinear beam structure.

28. The transducer of claim 25 wherein the first layer is formed of (100) oriented silicon crystal.

29. The transducer of claim 25 further including:
an electronic circuit formed in the other end of the curvilinear beam structure;
wherein the vertical plates have an aspect ratio of at least 10:1; and
wherein the first layer is formed of (100) oriented silicon crystal.

30. The semiconductor transducer of claim 1 wherein said recessed region of said second single crystal silicon wafer has a generally planar surface.

31. The semiconductor transducer of claim 1 wherein one of said two generally opposite facing first generally horizontal surfaces faces said recessed region and is generally planar.

32. The transducer of claim 23 wherein said recessed region has a generally planar surface.

33. The transducer of claim 23 wherein said curvilinear beam has a generally planar surface suspended over and facing said recessed region.

34. The semiconductor transducer of claim 25 wherein said recessed region of said second single crystal silicon wafer has a generally planar surface.

35. The semiconductor transducer of claim 25 wherein one of said two generally opposite facing first generally horizontal surfaces faces said recessed region and is generally planar.

36. A semiconductor transducer comprising:
a single crystal silicon substrate;
a curvilinear single crystal silicon structure formed in said substrate and including two generally oppositely disposed substantially vertical surfaces and two oppositely disposed generally horizontal surfaces; and
a generally planar surface over which said structure is suspended.

37. The semiconductor transducer of claim 36 wherein one of said two horizontal surfaces of said curvilinear structure faces the planar surface and is generally planar.

38. The semiconductor transducer of claim 36 further comprising a carrier, said carrier defines said generally planar surface over which said structure is suspended.

39. The semiconductor transducer of claim 38 wherein said carrier includes a silicon wafer layer, said substrate and said carrier are fusion bonded together.

* * * * *